(12) United States Patent
Melgaard et al.

(10) Patent No.: US 10,330,388 B2
(45) Date of Patent: Jun. 25, 2019

(54) SUPPLY PLENUM FOR CENTER-TO-ENDS FIBER OXIDATION OVEN

(71) Applicant: Despatch Industries Limited Partnership, Lakeville, MN (US)

(72) Inventors: Hans L. Melgaard, North Oaks, MN (US); Matthew Benson, Geneva, IL (US); Phillip Vu, St. Louis Park, MN (US); Prathna Ung, Rosemount, MN (US)

(73) Assignee: Illinois Tool Works Inc., Glenview, IL (US)

( * ) Notice: Subject to any disclaimer, the term of this patent is extended or adjusted under 35 U.S.C. 154(b) by 157 days.

(21) Appl. No.: 14/923,917

(22) Filed: Oct. 27, 2015

(65) Prior Publication Data

US 2016/0131429 A1    May 12, 2016

Related U.S. Application Data

(60) Provisional application No. 62/076,737, filed on Nov. 7, 2014.

(51) Int. Cl.
*F27D 7/02* (2006.01)
*F26B 23/00* (2006.01)
(Continued)

(52) U.S. Cl.
CPC ............... *F27D 7/02* (2013.01); *D01F 9/32* (2013.01); *F26B 23/00* (2013.01); *F27B 9/3005* (2013.01)

(58) Field of Classification Search
CPC ........ F26B 23/00; F26B 3/082; F27B 9/3005; F27B 2009/3016; D01F 9/32;
(Continued)

(56) References Cited

U.S. PATENT DOCUMENTS 3,401,922 A * 9/1968 Jones, Jr. ................... B01J 8/44
414/214
3,727,324 A    4/1973 Melgaard
(Continued)

FOREIGN PATENT DOCUMENTS

GB          153620         10/1920
WO       2006059387        6/2006
(Continued)

OTHER PUBLICATIONS

International Searching Authority, "International Search Report from PCT Application No. PCT/US2015/059389 dated Feb. 1, 2016", "from Foreign Counterpart of U.S. Appl. No. 14/923,917", filed Feb. 1, 2016, pp. 1-10, Published in: WO.

*Primary Examiner* — Steven B McAllister
*Assistant Examiner* — Steven S Anderson, II
(74) *Attorney, Agent, or Firm* — McAndrews, Held & Malloy, Ltd.

(57) ABSTRACT

One embodiment is directed to an oven for heating fibers. The oven comprises a supply structure disposed within the oven between first and second ends of the oven. The supply structure comprises a plurality of plenums. The plenums are in fluid communication with a heating system. Each of the plenums comprises a pair of side walls, a bottom wall, and a top wall. Each of the plenums is configured so that first openings are formed in the respective side walls of that plenum. At least one plenum is configured so that one or more second openings are formed in at least one of the top wall or the bottom wall of at least one plenum. The at least one plenum is configured to supply heated gas from the heating system into the chamber from the first openings and said one or more second openings of the plenum.

8 Claims, 10 Drawing Sheets

(51) Int. Cl.
 *D01F 9/32* (2006.01)
 *F27B 9/30* (2006.01)
(58) Field of Classification Search
 CPC ............. D01F 9/322–9/328; F27D 7/02; F24F 2009/002; F24F 2009/007
 USPC ................................ 454/71, 76; 432/27, 200
 See application file for complete search history.

(56) References Cited

U.S. PATENT DOCUMENTS

| | | | |
|---|---|---|---|
| 4,032,289 A | 6/1977 | Johnson et al. | |
| 4,115,929 A * | 9/1978 | Staub | B01J 8/44 34/369 |
| 4,116,612 A | 9/1978 | Melgaard | |
| 4,208,572 A | 6/1980 | Melgaard | |
| 4,216,003 A * | 8/1980 | Diachuk | B01D 46/30 422/239 |
| 4,257,171 A * | 3/1981 | Johnson | B01J 8/44 34/582 |
| 4,290,210 A * | 9/1981 | Johansson | D21F 5/187 226/196.1 |
| 4,322,964 A | 4/1982 | Melgaard et al. | |
| 4,361,744 A | 11/1982 | Mercier et al. | |
| 4,389,978 A * | 6/1983 | Northcote | F23B 1/28 110/281 |
| 4,515,561 A | 5/1985 | Melgaard | |
| 4,718,178 A * | 1/1988 | Whipple | F26B 13/104 226/196.1 |
| 4,729,246 A | 3/1988 | Melgaard et al. | |
| 4,821,866 A | 4/1989 | Melgaard | |
| 4,846,669 A | 7/1989 | Melgaard | |
| 4,924,073 A | 5/1990 | Chiba | |
| 4,988,288 A | 1/1991 | Melgaard | |
| 5,156,312 A * | 10/1992 | Kurie | B65H 20/14 226/7 |
| 5,172,682 A * | 12/1992 | Luebke | A21B 1/245 126/21 A |
| 5,263,265 A | 11/1993 | Melgaard | |
| 5,295,448 A | 3/1994 | Vickery | |
| 5,334,818 A | 8/1994 | Edwards et al. | |
| 5,431,491 A | 7/1995 | Melgaard et al. | |
| 5,436,569 A | 7/1995 | Melgaard et al. | |
| 5,446,289 A | 8/1995 | Shodeen et al. | |
| 5,471,766 A * | 12/1995 | Heikkila | F26B 13/104 34/461 |
| 5,516,489 A | 5/1996 | Melgaard et al. | |
| 5,525,295 A | 6/1996 | Pflug et al. | |
| 5,788,484 A | 8/1998 | Melgaard et al. | |
| 6,027,337 A * | 2/2000 | Rogers | D01F 9/32 432/242 |
| 6,036,793 A | 3/2000 | Melgaard et al. | |
| 6,048,493 A | 4/2000 | Melgaard et al. | |
| 6,086,749 A * | 7/2000 | Kramer | B01J 8/222 208/108 |
| 6,455,815 B1 | 9/2002 | Melgaard et al. | |
| 6,552,560 B2 | 4/2003 | Melgaard et al. | |
| 6,879,779 B2 | 4/2005 | Melgaard | |
| 7,514,650 B2 | 4/2009 | Melgaard et al. | |
| 7,805,064 B2 | 9/2010 | Ragay et al. | |
| 7,975,402 B2 * | 7/2011 | Parent | D21F 5/044 34/585 |
| 8,007,276 B2 | 8/2011 | Melgaard et al. | |
| 8,308,356 B2 | 11/2012 | Melgaard | |
| 2002/0135389 A1 | 9/2002 | Melgaard et al. | |
| 2002/0146657 A1 | 10/2002 | Anderson et al. | |
| 2003/0085216 A1 | 5/2003 | Richert et al. | |
| 2004/0214124 A1 * | 10/2004 | Stockhausen | D01F 9/32 432/59 |
| 2004/0218913 A1 | 11/2004 | Melgaard | |
| 2006/0079172 A1 | 4/2006 | Fleming et al. | |
| 2008/0012499 A1 | 1/2008 | Ragay et al. | |
| 2008/0296283 A1 | 12/2008 | Melgaard et al. | |
| 2009/0110845 A1 | 4/2009 | Lu et al. | |
| 2009/0253091 A1 | 10/2009 | Melgaard et al. | |
| 2009/0260255 A1 | 10/2009 | Baccini | |
| 2009/0308860 A1 | 12/2009 | Baccini | |
| 2010/0186645 A1 | 7/2010 | Tiegs | |
| 2010/0267188 A1 | 10/2010 | Parks et al. | |
| 2011/0188538 A1 | 8/2011 | Melgaard | |
| 2011/0212010 A1 | 9/2011 | Bell | |
| 2012/0181265 A1 | 7/2012 | Menard | |
| 2012/0189968 A1 | 7/2012 | Warner et al. | |
| 2012/0260518 A1 | 10/2012 | Melgaard et al. | |
| 2012/0304479 A1 * | 12/2012 | Berner | D01F 9/32 34/203 |
| 2013/0059261 A1 | 3/2013 | Sprague | |
| 2013/0239431 A1 * | 9/2013 | Larsson | D21F 5/187 34/467 |
| 2014/0319118 A1 | 10/2014 | Melgaard | |

FOREIGN PATENT DOCUMENTS

| | | |
|---|---|---|
| WO | 2009053785 | 4/2009 |
| WO | 2011098215 | 8/2011 |

* cited by examiner

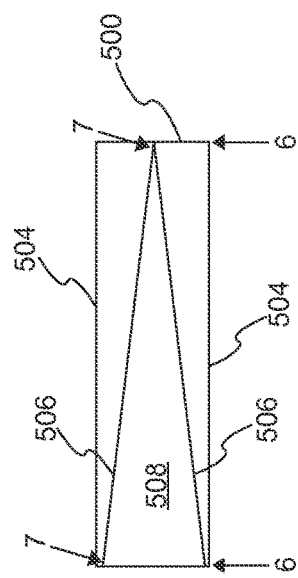
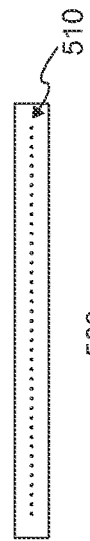
134
FIG. 5
504
FIG. 6
506
FIG. 7
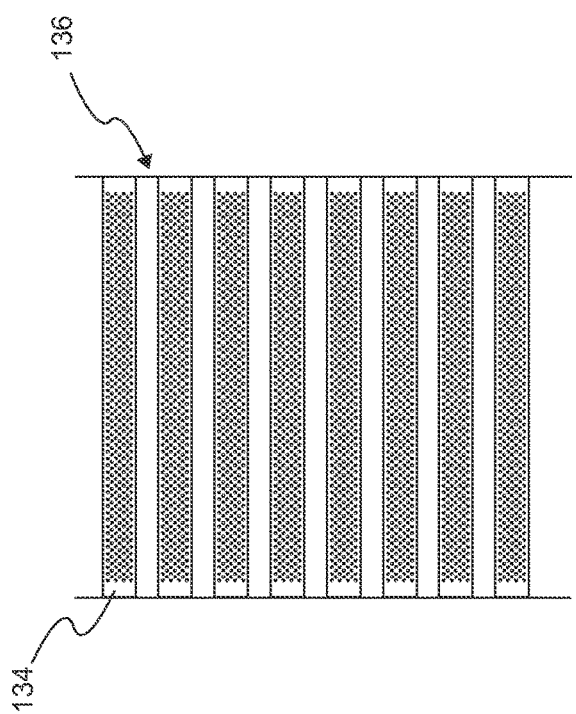
132
FIG. 4

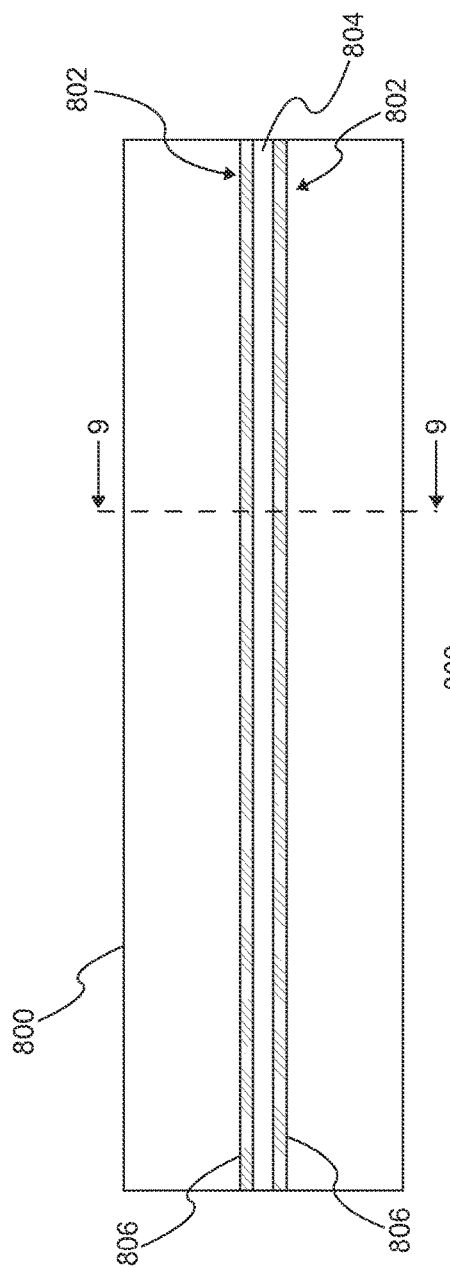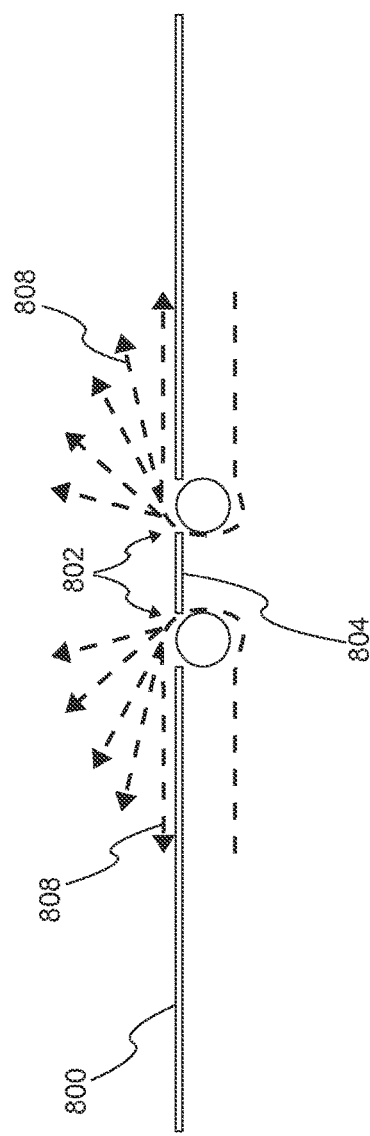

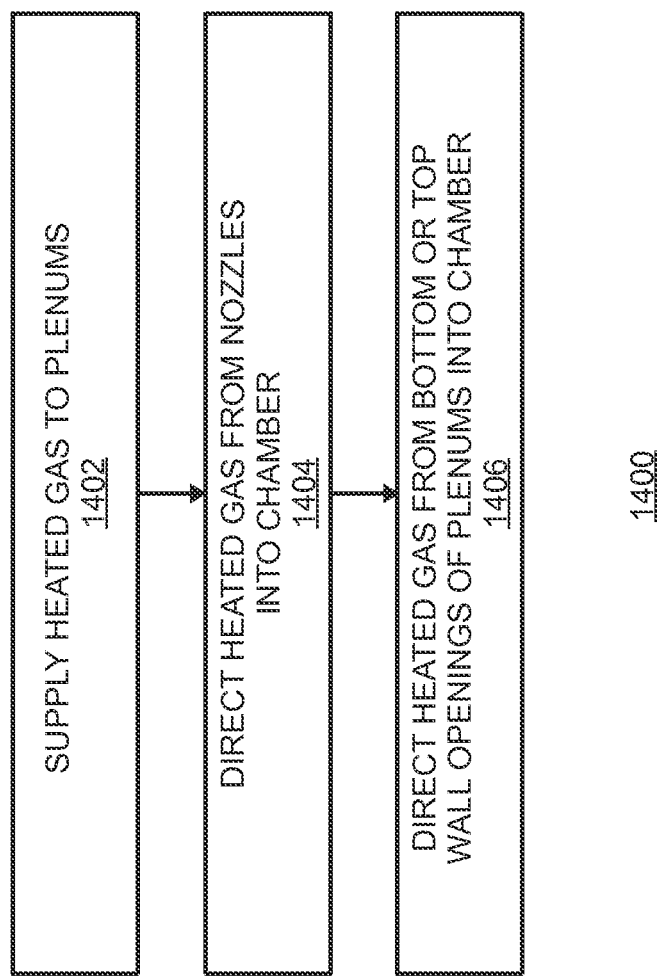

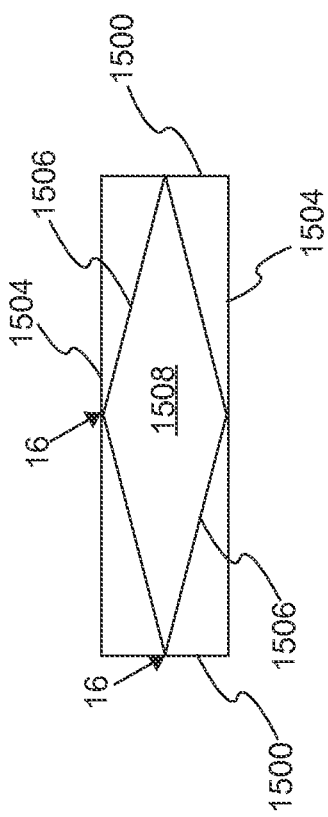
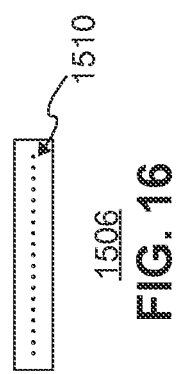

SUPPLY PLENUM FOR CENTER-TO-ENDS FIBER OXIDATION OVEN

CROSS-REFERENCE TO RELATED APPLICATIONS

This application claims the benefit of U.S. Provisional Patent Application Ser. No. 62/076,737, filed Nov. 7, 2014, which is hereby incorporated herein by reference.

BACKGROUND

Oxidation ovens are commonly used to produce carbon fibers from a precursor (such as an acrylic, pitch, or cellulose fibers). One common processing method involves successively drawing fibrous segments of the precursor material through one or more oxidation ovens.

Each of the oxidation ovens comprises a respective oxidation chamber in which the oxidation of the fiber segments takes place. Each fibrous segment can be drawn into a first oxidation oven as a carbon fiber precursor and then make multiple passes through each oxidation oven prior to exiting the final oxidation oven as an oxidized fiber segment. Roll stands and tensioners are used to draw the fibrous segments through the oxidation chambers of the ovens. Each oxidation oven heats the segments to a temperature approaching approximately 300° C. by means of a circulating flow of hot gas.

An example of such an oven is the Despatch Carbon Fiber Oxidation Oven, available from Despatch Industries, Minneapolis, Minn. A description of such an oven can be found in commonly-assigned U.S. Pat. No. 4,515,561. The oven described in the '561 Patent is a "center-to-ends" oxidation oven. In a center-to-ends oxidation oven, hot gas is supplied to the oxidation chamber of the oven from the center of the chamber and flows toward the ends of the chamber.

Typically, such a center-to-ends oxidation oven includes a center supply structure located in the center of the chamber. The center supply structure includes a plurality of supply plenums that are stacked one above each other. Gaps are provided between the plenums to enable passage of the fibrous segments between the plenums. Each plenum comprises a duct structure that receives heated air through one or both of its ends. Each plenum includes an array of holes formed in each of the opposing side walls of the corresponding duct structure. These holes are also referred to here as "nozzles". Each plenum is configured to receive heated air and direct the flow of heated gas in approximately horizontal and parallel streams of heated gas out of the nozzles towards both ends of the oxidation chamber.

There is typically no uniform flow of gas in the gaps between the plenums. Whenever the line is stopped, the fibers are stationary. The portions of the fibers that happen to be positioned in the gaps between the plenums during such line stoppages can be subjected to temperatures that differ from the temperatures that exist within the remainder of the chamber due to the lack of uniform gas flow in the gaps between the plenums. As a result, those portions of the fiber may oxidize differently than the surrounding portions of the fibers.

SUMMARY

One embodiment is directed to an oven for heating fibers. The oven comprises a supply structure disposed within the oven between first and second ends of the oven. The supply structure comprises a plurality of plenums. The plenums are in fluid communication with a heating system. Each of the plenums comprises a pair of side walls, a bottom wall, and a top wall. Each of the plenums is configured so that first openings are formed in the respective side walls of that plenum. At least one plenum is configured so that one or more second openings are formed in at least one of the top wall or the bottom wall of at least one plenum. The at least one plenum is configured to supply heated gas from the heating system into the chamber from the first openings and said one or more second openings of the plenum.

In one exemplary implementation, at least one slot is formed in at least one of the top wall or the bottom wall of at least one plenum. A structure having a rounded surface is positioned in the slot flush with the top wall or the bottom wall of the plenum. The structure can be implemented, for example, using a threaded rod or tube, a fluted rod or tube, or a corrugated rod or tube.

In another exemplary embodiment, a V-shaped indentation is formed in the top wall or the bottom wall of at least one plenum. The V-shaped indentation comprises two sides. One or more second openings are formed in each of the sides of the V-shaped indentation. A V-shaped cover is positioned in the V-shape indentation. Each of the sides of the V-shaped indentation can include a line of second openings formed in that side of the V-shaped indentation, where the second openings formed in each side of the V-shaped indentation are staggered from the second openings formed in the other side of the V-shaped indentation.

Another embodiment is directed to a method of heating fibers using an oven. The method comprises supplying heated gas to a plurality of plenums included in a supply structure disposed within an interior of the oven. The method further comprises directing at least a portion of the heated gas into the interior of the oven from first openings formed in side walls included in each of the plenums. The method further comprises directing at least a portion of the heated gas into the interior of the oven from one or more second openings formed in at least one of the top wall or the bottom wall of at least one plenum.

DRAWINGS

FIG. 4 is illustrates details of the center supply structure of the oven shown in FIG. 1.

FIG. 5 is a cross-sectional plan view of one exemplary embodiment of a supply plenum.

FIG. 6 is a side view of one side wall of the supply plenum shown in FIG. 5.

FIG. 7 is a side view of one squash baffle of the supply plenum shown in FIG. 5.

FIG. 8 is a plan view of the top wall of a supply plenum in an exemplary embodiment.

FIG. 9 is cross-sectional side view of the top wall shown in FIG. 8.

FIG. 14 is a flow diagram of an exemplary embodiment of a method of heating fibers by contact with heated gas.

FIG. 15 is a cross-sectional plan view of another exemplary embodiment of a supply plenum.

FIG. 16 is a side view of one squash baffle of the supply plenum shown in FIG. 15.

DETAILED DESCRIPTION

Figure 1:
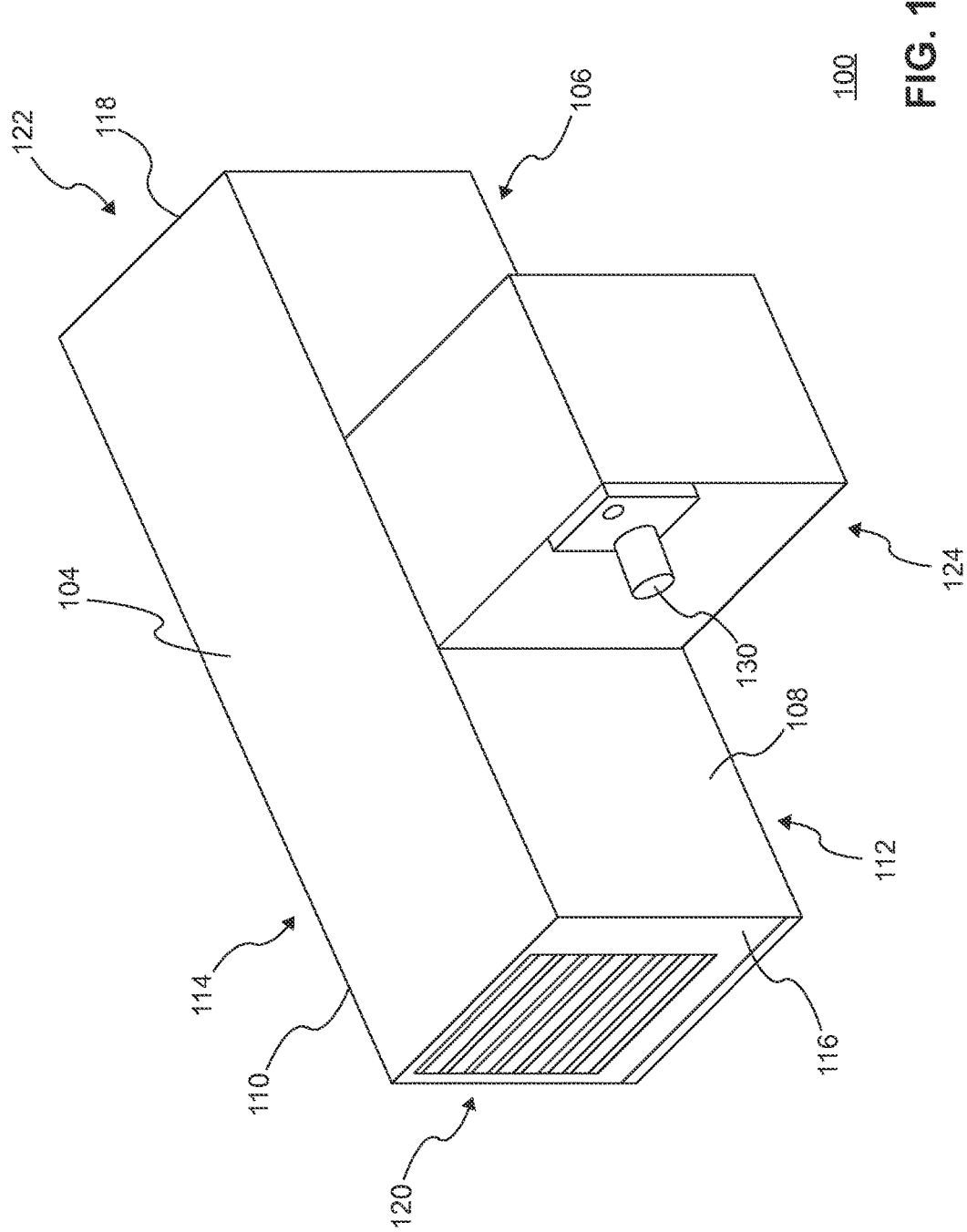
FIG. 1 is a perspective view of one exemplary embodiment of an oven.
Figure 2:
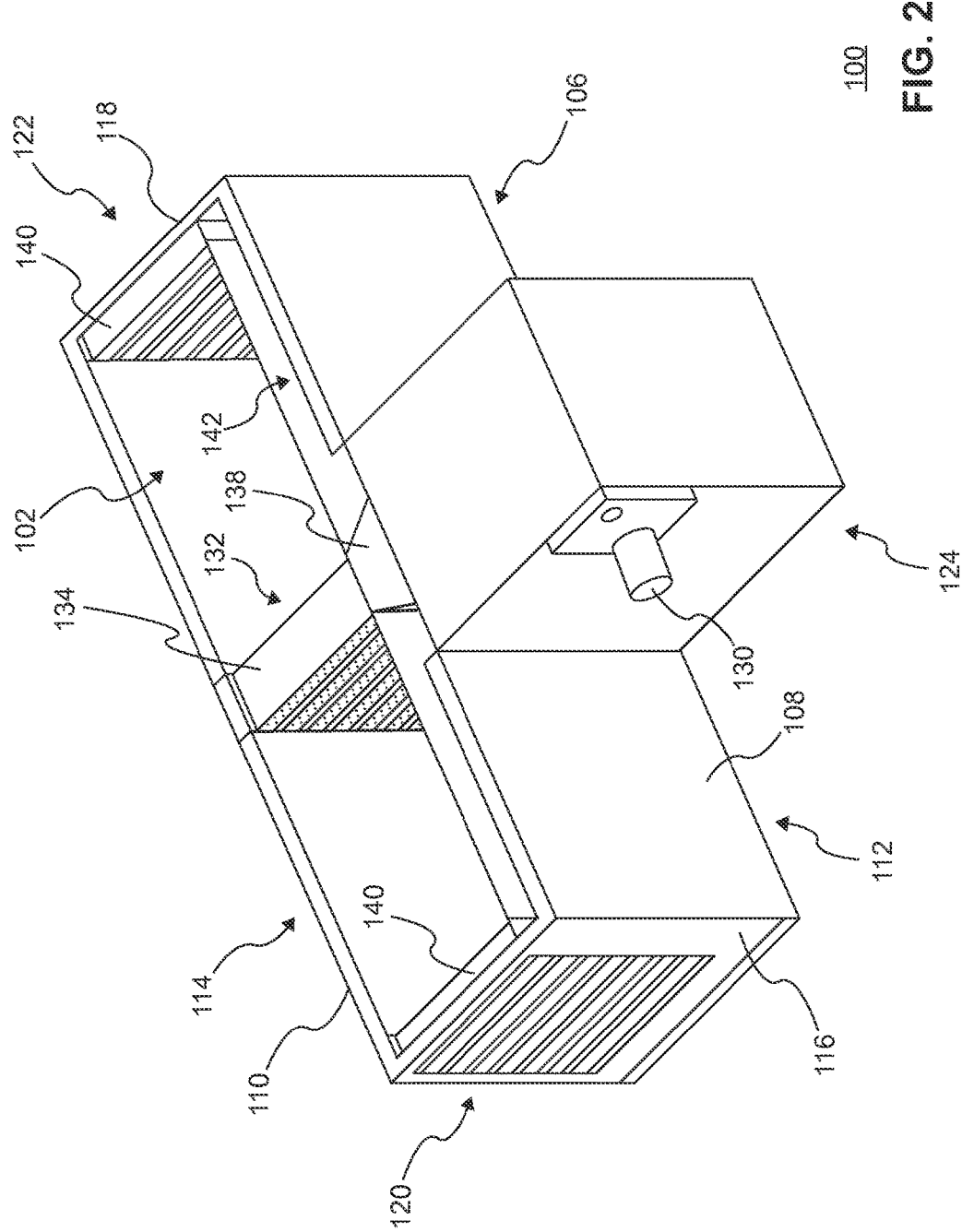
FIG. 2 is a perspective view of the oven shown in FIG. 1 with the top wall removed from the chamber of the oven.
Figure 3:
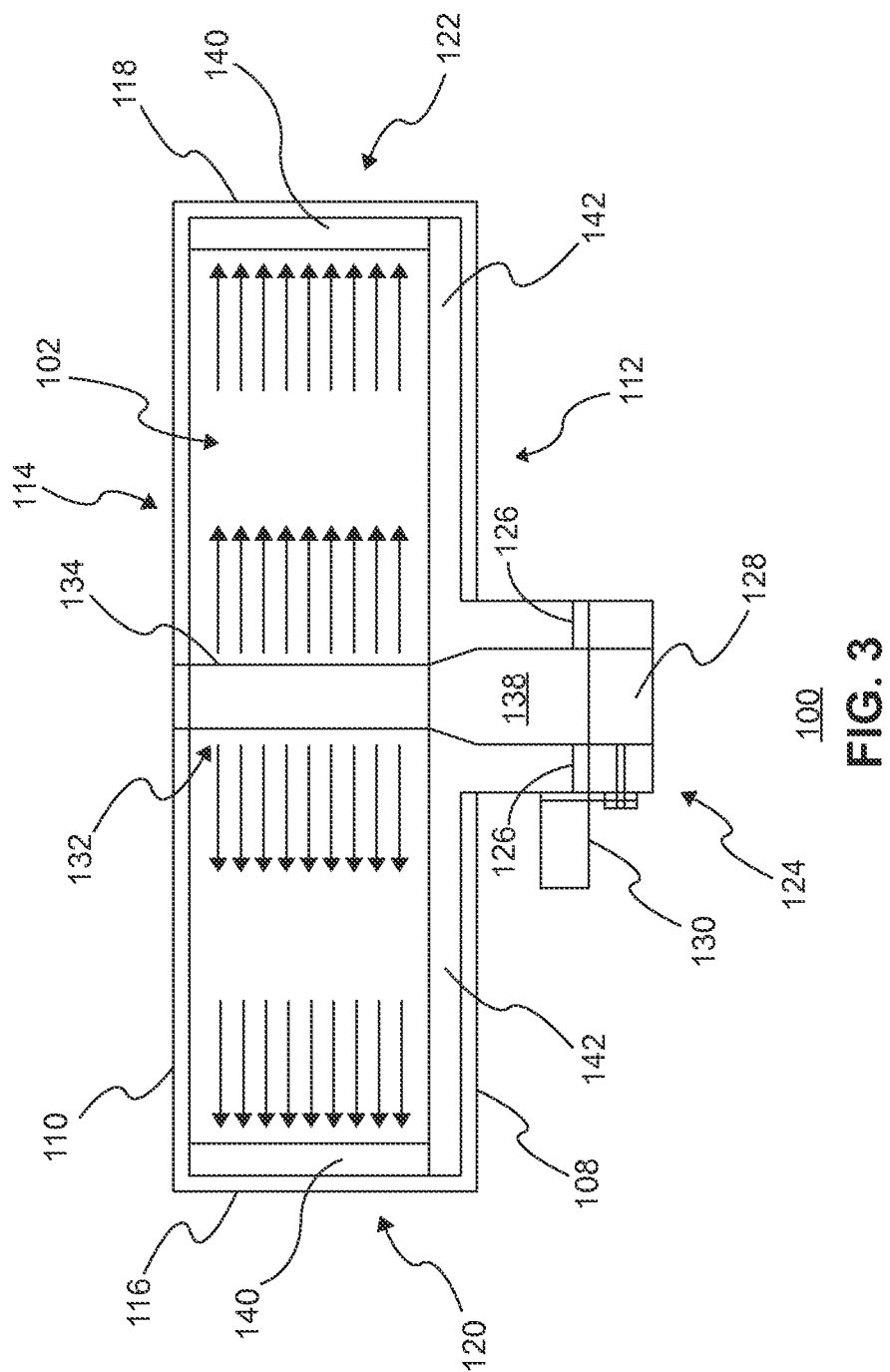
FIG. 3 is a cross-sectional plan view of the oven shown in FIG. 1.
Figure 10:
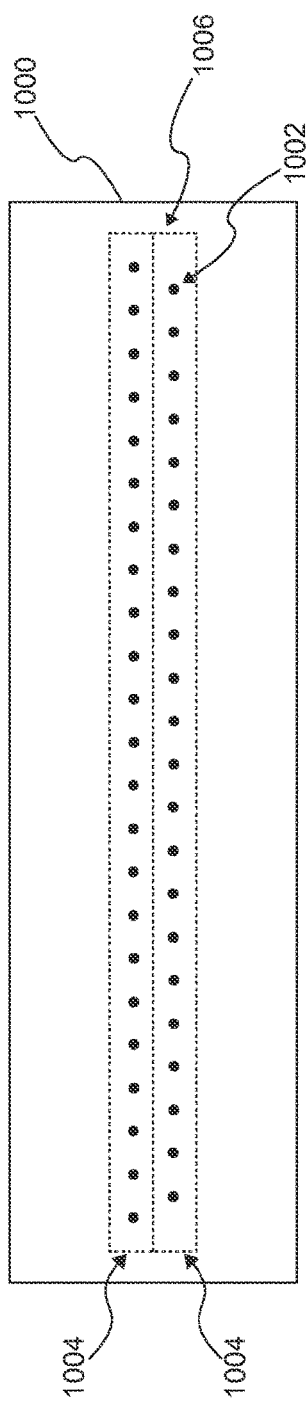
FIG. 10 is a plan view of the top wall of a supply plenum in another exemplary embodiment.
Figure 11:
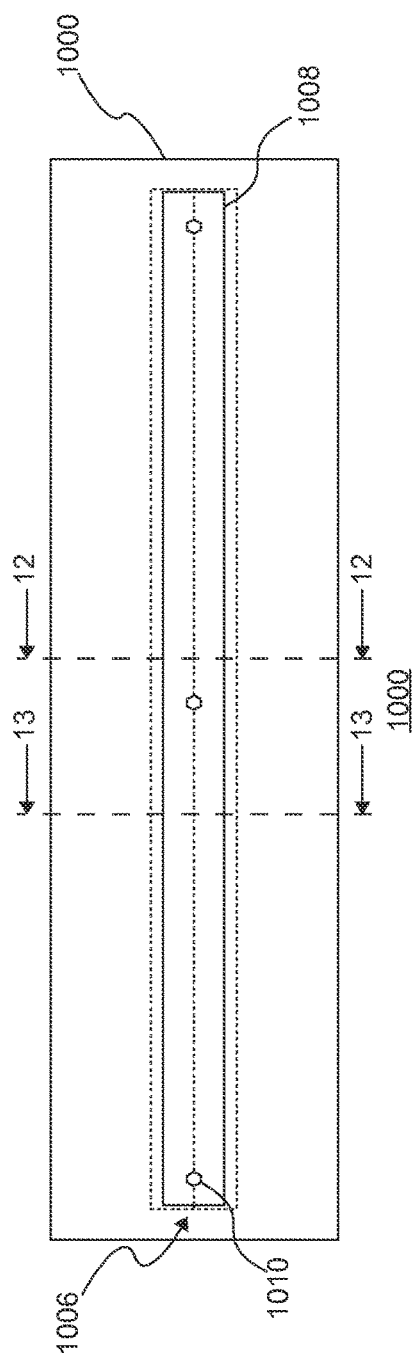
FIG. 11 is a plan view of the top wall of the supply plenum shown in FIG. 10 with a V-shaped cover positioned over the V-shaped indention.

FIGS. 1-3 illustrate one exemplary embodiment of an oxidation oven 100 in which the improved supply plenums described below can be used. It is to be understood, however, that the improved plenums described below can be used in other oxidations ovens.

The oxidation oven 100 shown in FIGS. 1-3 is suitable for use in producing carbon fibers using an oxidation process of the type described above. For example, the exemplary embodiment of an oxidation oven 100 shown in FIGS. 1-3 can be used in oxidation processes that make use of one or multiple ovens (for example, in a stacked configuration) as is known to those of skill in the art.

One of ordinary skill in the art will recognize that, for the sake of brevity and clarity, various conventional features used in oxidation ovens have been omitted from the figures and the following description. Examples of such features include, without limitation, baffles, ducts, vanes, vents, and the like used to adjust the flow of gas within the oven 100, vestibules and exhaust features to reduce the discharge of undesirable processes gases into the ambient environment, and/or insulation, louvers, and other thermal features to improve the thermal efficiency of the oven 100. It is to be understood that the exemplary oven 100 shown in FIGS. 1-3 can include such features.

In the exemplary embodiment shown in FIGS. 1-3, the oven 100 comprises an oven chamber 102 in which the oxidation of fiber segments take place. In this exemplary embodiment, the oven chamber 102 is defined by a plurality of walls. The walls that define the oxidation chamber 102 include a top wall 104, a bottom wall 106, two side walls 108 and 110 along respective sides 112 and 114 of the chamber 102, and two end walls 116 and 118 at respective ends 120 and 122 of the chamber 102. A respective entry for the fibers is formed in each of the end walls 116 and 118. Each entry is formed by a plurality of slots, which extend between first and second sides 112 and 114 of the chamber 102, and through which the fibrous segments heated by the oxidation oven 100 are drawn. The entries and slots can be formed in a conventional manner.

The oven 100 also comprises a heating system 124. The heating system 124 is used to supply heated gas into the chamber 102. In this exemplary embodiment, the gas that is used is ambient air.

The heating system 124 can be implemented in various ways. In the exemplary embodiment shown in FIGS. 1-3, the heating systems 124 is implemented using at least one heater 126 (shown in FIG. 3), a blower 128 (shown in FIG. 3) to draw gas through the heater 126, and a motor 130 to power the blower 128. Each heater 126 can be implemented in various ways. For example, each heater 126 can be implemented using one or more heating elements. Also, each heater 126 can be implemented using an indirect gas heater, an electric heater, or combinations thereof. Each heater 126 can be implemented in other ways.

The heating system 124 can be controlled, for example, using one or more suitable controllers (such as proportional-integral-derivative (PID) controllers).

The oven 100 includes a supply structure 132 disposed within the interior of the chamber 102 between the ends 120 and 122 of the chamber 102. In the exemplary embodiment shown in FIGS. 1-3, the oven 100 is a center-to-ends oxidation oven in which heated gas is supplied from the center of the oxidation chamber 102 towards the ends 120 and 122 of the chamber 102. In this exemplary embodiment, the supply structure 132 is disposed within the interior of the chamber 102 at or near the center of the chamber 102 between the ends 102 and 122 and is also referred to here as the "center supply structure 132."

In the exemplary embodiment shown in FIGS. 1-3, the center supply structure 132 comprises a plurality of supply plenums 134 that are stacked one above each other with gaps therebetween. The center supply structure 132 is shown in more detail in FIG. 4. Gaps 136 (shown in FIG. 4) are provided between the stacked supply plenums 134 to enable passage of the fibrous segments between the plenums 134.

More details regarding the supply plenums 134 are provided below in connection with the description of FIGS. 5-10.

The plenums 134 are in fluid communication at one or both of their ends with a supply duct 138 (shown in FIGS. 2 and 3) in order to receive heated gas from the heating system 124. In the exemplary embodiment shown in FIGS. 1-3, each plenum 134 is configured to receive heated air through one of its ends (though it is to be understood that in other embodiments, each plenum receives heated air through both of its ends).

The supply duct 138 can be appropriately tapered or provided with adjustable slots or other features (not shown) to adjust the flow heated gas so that the velocity of heated gases exiting the plenums 134 is substantially uniform.

Each oven 100 also includes two return structures 140 within the oxidation chamber 102. One return structure 140 is positioned near the first end wall 116, and the other return structure 140 is positioned near the second end wall 118. Each of the return structures 140 includes a plurality of return channels that are each stacked one above another and that are positioned to generally correspond with the positions of corresponding plenum 134 of the center supply structure 132. Gaps are provided between the return channels to enable passage of fibrous segments between the return channels.

The return channels of each return structure 140 are configured to receive at least a portion of the gas directed from the center supply structure 132 toward that return structure 140. That is, each return structure 140 receives gas directed from one side of the plenums 134 in the center supply structure 132 toward that return structure 140.

A return duct 142 is used to establish fluid communication between each return structure 140 and the heating system 124. In this way, at least a portion of the heated gas received by the return structures 140 is directed back to the heating system 124 to be heated and supplied to the plenums 134 via the supply ducts 138 as described above.

In the exemplary embodiment shown in FIGS. 1-3, the return ducts 142 are located within the walls of the chamber 102. However, it is to be understood that the return ducts 142 can be implemented in other ways (for example, by positioning at least a portion of the return ducts 142 outside of the walls of the chamber).

In the exemplary embodiment described here in connection with FIGS. 1-3, each of the supply plenums 134 is implemented as shown in FIGS. 5-7. Each plenum 134 is supplied with heated gas at a first end 500 of the plenum 134. The heated gas is supplied from the supply duct 138.

Each plenum 134 is generally rectangular in cross section and extends horizontally between, but spaced from the side walls 108 and 110 of the chamber 102. As shown in FIG. 6, each plenum 134 has holes or openings 502 formed in the side walls 504 of the plenum 134 that face the respective ends 120 and 122 of the chamber 102. These openings 502 are also referred to here as the "nozzles" 502. FIG. 6 illustrates the nozzles 502 formed in one of the side walls 504 of the plenum 134. In this exemplary embodiment, the nozzles 502 are formed in both side walls 504 the same way (though only the nozzles 502 for one of the side walls 504 are shown).

The nozzles 502 extend across the width of the plenum 134. The nozzles 502 are constructed and arranged so as to direct the flow of the received heated gas in approximately horizontal and parallel streams of heated gas toward the ends 120 and 122 of the oxidation chamber 102. The streams of gas are directed alongside each fibrous segment that traverses that portion of the oxidation chamber 102.

Each plenum 134 includes one or more baffles 506 that are disposed within the interior of the plenum 134 between the side walls 504 of the plenum 134. These baffles 506 are also referred to here as the "squash baffles" 506. In the embodiment shown in FIGS. 5-7, the squash baffles 506 are arranged in a V-shape as shown in FIG. 5, with the tip portion of the V-shape near the end 500 where heated gas is supplied to the plenum 134. This V-shaped arrangement of the squash baffles 506 is generally designed to direct the flow of the received heated gas out of the nozzles 502 in a uniform manner.

In conventional plenum designs, no heated gas flows within the interior space 508 between the two squash baffles 506. Also, in conventional plenum designs, there are no openings formed along the bottom or top walls of each individual plenum 134. However, in the exemplary embodiment shown in FIGS. 5-7, one or more of the squash baffles 506 of the plenum 134 includes at least one opening 510 through which heated gas is able to pass and enter the space 508 between the squash baffles 506. These openings 510 are also referred to here as "squash-baffle" openings 510.

In this exemplary embodiment, the squash-baffle openings 510 are implemented as a straight line of round holes formed in each of the squash baffles 506. FIG. 7 illustrates the squash-baffle openings 510 formed in one of the squash baffles 506 of the plenum 134. In this exemplary embodiment, the squash-baffle openings 510 are formed in both squash baffles 506 the same way (though only the squash-baffle openings 510 for one of the squash baffles 506 are shown).

In addition, one or more openings are formed in one or more of the top wall or the bottom wall of each plenum 134. That is, one or more openings are formed in the top wall, the bottom wall, or both the top wall and the bottom wall of each plenum 134. In the exemplary embodiments described herein, these openings are formed in only the top wall of each plenum 134 (however, it is to be understood that openings can be formed in only the bottom wall of each plenum 134 or both the top wall and bottom wall of each plenum 134). Mesh, a screen, or other structure can be used to cover these openings to prevent transfer of errant fiber or particulate into or out of the plenum 134.

A portion of the heated gas that is supplied to each plenum 134 will flow through the squash-baffle openings 510 into the space 508 between the squash baffles 506. At least a portion of the heated gas that flows into the space 508 between the squash baffles 506 will flow out of the top-wall openings. As a result, there will be a flow of gas between the plenums 134 in the gaps 136 within the center supply structure 132. Heated gas flows out of the nozzles 502 in approximately horizontal and parallel streams of heated gas toward the ends 120 and 122 of the oxidation chamber 102 alongside each fibrous segment that traverses that portion of the oxidation chamber 102.

This flow of gas in the gaps 136 between the plenums 134 in the center supply structure 132 will reduce the likelihood that the portions of the fibers that happen to be positioned within the supply structure 132 during line startup or any line stoppages will be subjected to temperatures that differ from the temperatures that exist within the remainder of the chamber 102. Also, during normal operation (when the fibers are moving through the chamber 102 of the oven 100), consistent and uniform airflow within the chamber 102 tends to improve exotherm removal. However, as noted above, there is typically no airflow within the gaps between the plenums of a conventional center supply structure. With the exemplary embodiments described here, overall exotherm removal will tend to be improved by providing a consistent and uniform flow of heated gas from the top-wall openings into the gaps 136 within the center supply structure 132.

In one some applications, it is desirable for the openings in the top wall to be configured to enable approximately 4 percent of the overall flow delivered to the plenum 134 to pass through the openings into the gaps 136 between the plenums 134 in the center supply structure 132.

Openings can be formed in one or more of the top or bottom walls of the plenum 134 in various ways.

FIGS. 8-9 illustrate one way of forming such openings in the top wall 800 of each plenum 134 of FIGS. 1-7. In the example shown in FIGS. 8-9, two parallel slots 802 are formed in the top wall 800 of the plenum 134. A portion 804 of the top wall 800 is positioned between the two slot openings 802. For each slot 802, a structure 806 having a rounded surface is mounted (or otherwise positioned) in the slot 802 flush with the top wall 800 of the plenum 134 such that no portion of the rounded surface of the structure 806 extends above the plane of the top wall 800 of the plenum 134.

As noted above, a portion of the heated gas that is supplied to each plenum 134 will flow through the squash-baffle openings 506 into the space 508 between the squash baffles 506. Also, at least a portion of the heated gas that flows into the space 508 between the squash baffles 506 will flow out of the slots 802 formed in the top wall 800 of the plenum 134. The structure 806 is positioned so that at least some of the gas passes over at least a part of the rounded surface of the structure 806 as the gas exits the corresponding slot 802.

The slots 802 and the structures 806 in each plenum 134 are configured so that a predetermined amount of the heated gas supplied to the plenum 134 will flow out of the slots 802 into the gap 136 above that plenum 134. For example, in one exemplary implementation, the slots 802 and structures 806 in each plenum 134 are configured so that approximately 4% of the heated gas supplied to the plenum will flow out of the slots 802 into the gap 136 above that plenum 134. In this exemplary embodiment, the structure 806 is configured so that its rounded surface includes one or more features that provide the desired amount of heated gas to escape through the slots 802.

In one implementation of the exemplary embodiment shown in FIGS. 8-9, each structure 806 is implemented using a threaded rod or tube that is mounted flush to the top wall 800 of the plenum 134 beneath one of the slots 802 such that no portion of the rounded surface of the rod or tube extends above the plane of the top wall 800 of the plenum 134. In such an implementation, the threaded rods or tubes can be held in place using any suitable mechanism (such as, for example, a pair brackets extending down from the inside of the top wall). It is to be understood that other structures 806 can be used instead of or in addition to a threaded rod or tube such as a fluted rod or tube or a corrugated rod or tube. Other structures 806 can also be used.

Due to the Coanda effect, at least some of the heated gas that exits the slots 802 into the gap 136 above the plenum 134 will flow horizontally along the top wall 800 of the plenum 134. FIG. 9 illustrates one example of the flow of heated gas 808 from the slots 802 into the gap 136. This flow of heated gas 808 into the gaps 136 above the plenums 134 will reduce the likelihood that the portions of the fibers that happen to be positioned within the central supply structure 132 during line startup or any line stoppages will be subjected to temperatures that differ from the temperatures that exist within the remainder of the chamber 102 and will provide airflow in the gaps 136 between the plenums 134 which will tend to improve exotherm removal.

FIGS. 10-13 illustrate another way of forming openings in at least one of the top wall or the bottom wall of each plenum 134 of FIGS. 1-4. In the example shown in FIGS. 10-13, two lines of round holes 1002 (shown in FIG. 10) are formed in the top wall 1000 of each plenum 134 on each side 1004 of a V-shaped indentation 1006 formed in the top wall 1000 of each plenum 134. In this example, the holes 1002 all have the same size and shape and are arranged in two staggered, straight lines. A V-shaped cover 1008 (shown in FIGS. 11-13) is positioned and centered over at least a portion of the V-shaped indentation 1006. A passageway 1014 is formed between each side 1004 of the V-shaped indentation 1006 in the top wall 1000 and one side of the V-shaped cover 1008 mounted in the center of the indentation 1006. In this exemplary embodiment, the cover 1008 is mounted to the top wall 1000 or the associated plenum 134 using one or more bolts 1010 (or similar adjustable fasteners) and nuts (not shown). The cover 1008 can be vertically adjusted by inserting or removing spacers 1016 in the passageway 1014 to control the amount of flow from the holes 1002. In this exemplary embodiment, "V shape" in both the V-shaped indentation 1006 and the V-shaped cover 1008 have a ninety-degree angle. It is to be understood, however, that other configurations can be used (for example, where the holes are arranged differently, have different shapes or sizes, where the size or shape of the holes are not all the same, or where the V-shaped indentation and/or cover have a V shape formed with other than a ninety-degree angle).

Figure 12:
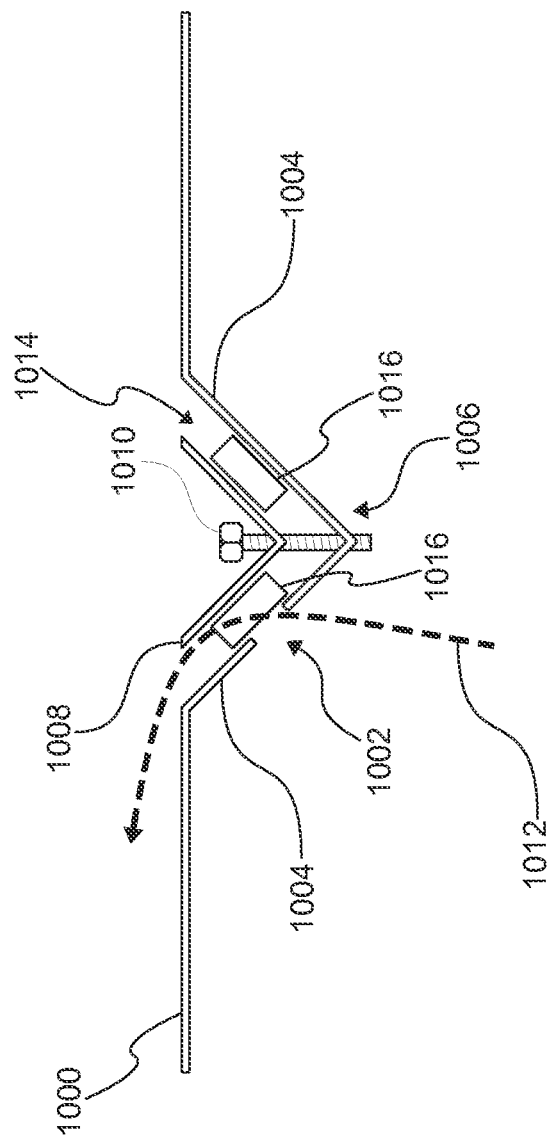
FIGS. 12-13 are cross-sectional side views of the top wall shown in FIG. 11.
Figure 13:
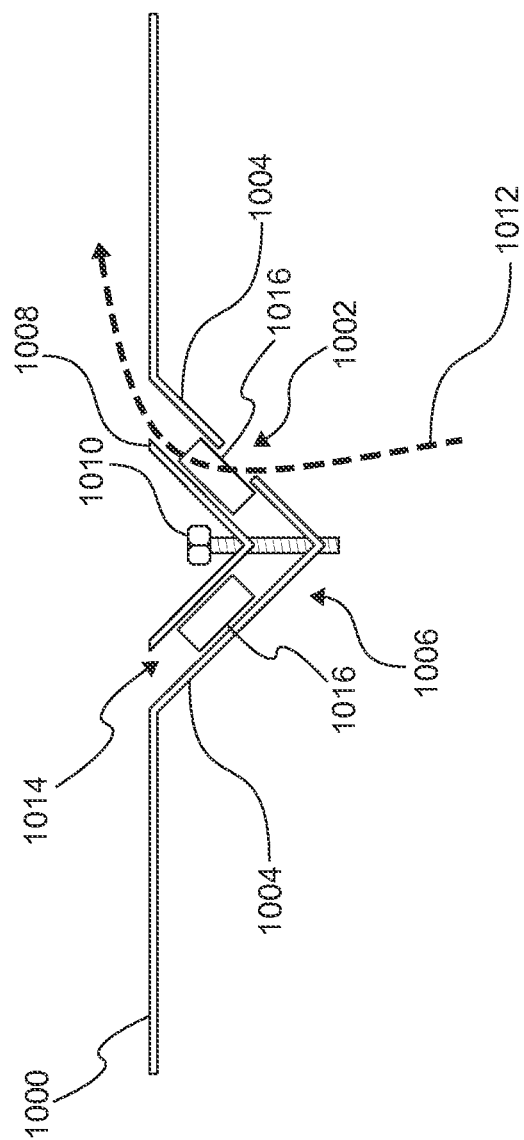

FIGS. 12-13 illustrate one example of the flow of heated gas 1012 from the holes 1002 into the gap 136. FIG. 12 illustrates a hole 1002 on one side 1004 of the V-shaped indentation 1006, and FIG. 13 illustrates a hole 1002 on the other side 1004 of the V-shaped indentation 1006. Heated gas 1012 exiting the holes 1002 will tend to flow through the corresponding passageway 1014, and at least some of the heated gas 1012 will flow generally horizontally along the top wall 1000 of the plenum 134. This will reduce the likelihood that the portions of the fibers that happen to be positioned within the center supply structure 132 during line startup or any line stoppages will be subjected to temperatures that differ from the temperatures that exist within the remainder of the chamber 102 and will tend to improve exotherm removal in the gaps 136 between the plenums 134.

Also, the holes 1002 can be sized and arranged on the top wall 1000 of the plenums 134 so that the heated flow of gas agitates the fibers passing over the plenum 134. Such agitation of the fibers tends to promote more uniform oxidation of the fibers.

In the example shown in FIGS. 10-13, the holes 1002 are formed in the top wall of each plenum 134. However, it is to be understood that the holes 1002 can be formed in the bottom wall of each plenum 134 in addition to or instead of being formed in the top wall.

FIG. 14 is a flow diagram of an exemplary embodiment of a method 1400 of heating fibers by contact with heated gas. The embodiment of method 1400 shown in FIG. 14 is described here as being implemented using the exemplary embodiment of an oxidation oven 100 described above in connection with FIGS. 1-3. However, it is to be understood that other embodiments can be implemented in other ways.

Method 1400 comprises supplying heated gas to the plurality of plenums 134 included in the center supply structure 132 disposed within the interior of the oven 102 (block 1402). In this exemplary embodiment, the heated gas is supplied from the heating system 128 to each plenum 134 via the supply duct 138.

Method 1400 further comprises directing at least a portion of the heated gas into the interior of the oven 102 from the nozzles 502 included in each of the plenums 134 (block 1404). In this exemplary embodiment, the heated gas flows out of the nozzles 502 in approximately horizontal and parallel streams of heated gas toward the ends 120 and 122 of the oxidation chamber 102 alongside each fibrous segment that traverses that portion of the oxidation chamber 102.

Method 1400 further comprises directing at least a portion of the heated gas into the interior of the oven 102 from one or more openings formed in one or more of the top wall or bottom wall of the plenums 134 (block 1406). This results in heated gas flowing into the gaps 136 between the plenums 134 in the center supply structure 132. In the exemplary embodiments described above, openings are formed in the top wall of each plenum 134 (using, for example, the configuration shown in FIGS. 8-9 or the configuration shown in FIGS. 10-13).

The embodiments described above are merely exemplary and are not intended to be limiting.

For example, in the exemplary embodiments described above, each plenum 134 is supplied with heated gas from a single side. However, in other embodiments, the plenums in the center supply structure are supplied with gas from both sides.

One such exemplary embodiment of a plenum 1534 is shown in FIGS. 15-16. The plenum 1534 is generally the same as the plenum 134 described above in connection with FIGS. 5-7 except as described below.

Each plenum 1534 includes four squash baffles 1506 that are disposed within the interior of each plenum 1534 between the side walls 1504 of the plenum 1534. In the embodiment shown in FIGS. 15-16, the squash baffles 1506 are arranged in a diamond shape. In this exemplary embodiment, each plenum 1534 is supplied with heated gas from both ends 1500 of the plenum 1534.

The tip portion of each end of the diamond shape of the squash baffles 1506 is positioned near one of the ends 1500 of the plenum 1534 where heated gas is supplied to the plenum 1534. This diamond-shaped arrangement of the squash baffles 1506 is generally designed to direct the flow of the received heated gas out of the nozzles (not shown in FIGS. 15-16) formed in the side walls 1504 of the plenum 1534 in a uniform manner.

One or more of the squash baffles 1506 of the plenum 1534 includes at least one squash-baffle opening 1510 (shown in FIG. 16) through which heated gas is able to pass and enter the space 1508 between the squash baffles 1506. FIG. 16 illustrates the squash-baffle openings 1510 formed in one of the squash baffles 1506 of the plenum 1534. In this exemplary embodiment, the squash-baffle openings 1510 are formed in all of the squash baffles 1506 the same way (though only the squash-baffle openings 1510 for one of the squash baffles 1506 are shown). In this exemplary embodiment, the squash-baffle openings 1510 are implemented as a straight line of round holes formed in each of the squash baffles 1506 in the same general manner as described above in connection FIG. 7.

Also, as with the plenums 134 described above, one or more openings are formed in one or more of the bottom or top walls of each plenum 1534 (using any of the approaches described above). Mesh, a screen, or other structure can be used to prevent transfer of errant fiber or particulate into or out of the plenum 1534.

A portion of the heated gas that is supplied to each plenum 1534 will flow through the squash-baffle openings 1510 into the space 1508 between the squash baffles 1506. At least a portion of the heated gas that flows into the space 1508 between the squash baffles 1506 will flow out of the top-wall openings. As a result, there will be a flow of gas between the plenum 1534 in the gaps 136 within the center supply structure 132.

Other embodiments can be configured in other ways. For example, one or more openings can be formed in the bottom wall of one or more of the plenums in addition to or instead of forming openings in the top wall of the plenums. Moreover, in the exemplary embodiment shown here, each plenum in the center supply structure has the same configuration and design. However, this need not be the case and, instead, one or more plenums included in the center supply structure can have configurations and/or designs that differ from one or more other plenums included in the center supply structure.

A number of embodiments have been described. Nevertheless, it will be understood that various modifications to the described embodiments may be made without departing from the spirit and scope of the claimed invention.

EXAMPLE EMBODIMENTS

Example 1 includes an oven for heating fibers, the oven comprising: a supply structure disposed within the oven between first and second ends of the oven, the supply structure comprising a plurality of plenums, wherein the plenums are in fluid communication with a heating system; wherein each of the plenums comprises a pair of side walls, a bottom wall, and a top wall; wherein each of the plenums is configured so that first openings are formed in the respective side walls of that plenum; and wherein at least one plenum is configured so that one or more second openings are formed in at least one of the top wall or the bottom wall of said at least one plenum, wherein said at least one plenum is configured to supply heated gas from the heating system into the chamber from the first openings and said one or more second openings of said at least one plenum.

Example 2 includes the oven of Example 1, wherein said one or more second openings are formed in: only the top wall of said at least one plenum; only the bottom wall of said at least one plenum; or both the top wall and the bottom wall of said at least one plenum.

Example 3 includes the oven of any of the Examples 1-2, wherein said at least one plenum comprises at least one squash baffle, wherein at least one squash-baffle opening is formed in said at least one squash baffle so that heated gas flows out of said one or more second openings formed in said at least one of the top wall or the bottom wall of said at least one plenum.

Example 4 includes the oven of Example 3, wherein said at least one plenum comprises two or more squash baffles, wherein said at least one plenum is configured to have a space formed between the squash baffles, wherein said one or more second openings are formed in at least one of the top wall or the bottom wall of said at least one plenum in the space between the squash baffles; and wherein the squash baffles are configured to least one of: receive heated air from one end thereof, wherein said at least one plenum is configured so that the squash baffles are arranged in a V shape; or receive heated air from two ends thereof, wherein said plenum is configured so that the squash baffles are arranged in a diamond shape.

Example 5 includes the oven of any of the Examples 1-4, wherein said one or more second openings formed in said at least one of the top wall or the bottom wall of said at least one plenum comprises: at least one slot formed in said at least one of the top wall or the bottom wall of said at least one plenum; and a structure having a rounded surface positioned in the slot flush with said at least one of the top wall or the bottom wall of said at least one plenum.

Example 6 includes the oven of Example 5, wherein the structure comprises a threaded rod or tube, a fluted rod or tube, or a corrugated rod or tube.

Example 7 includes the oven of any of the Examples 1-6, wherein said at least one plenum comprises: a V-shaped indentation formed in said at least one of the top wall or the bottom wall of said at least one plenum, the V-shaped indentation comprising two sides, wherein said one or more second openings are formed in each of the sides of the V-shaped indentation; and a V-shaped cover positioned in the V-shape indentation.

Example 8 includes the oven of Example 7, wherein each of the sides of the V-shaped indentation comprises a line of said one or more second openings formed in that side of the V-shaped indentation, wherein said one or more second openings formed in each side of the V-shaped indentation are staggered from said one or more second openings formed in the other side of the V-shaped indentation.

Example 9 includes a method of heating fibers using an oven, the method comprising: supplying heated gas to a plurality of plenums included in a supply structure disposed within an interior of the oven; directing at least a portion of the heated gas into the interior of the oven from first openings formed in side walls included in each of the plenums; and directing at least a portion of the heated gas into the interior of the oven from one or more second openings formed in at least one of the top wall or the bottom wall of at least one plenum.

Example 10 includes the method of Example 9, wherein said one or more second openings are formed in: only the top wall of said at least one plenum; only the bottom wall of said at least one plenum; or both the top wall and the bottom wall of said at least one plenum.

Example 11 includes the method of any of the Examples 9-10, wherein said at least one plenum comprises at least one squash baffle, wherein at least one squash-baffle opening is formed in said at least one squash baffle; and wherein directing at least a portion of the heated gas into the interior of the oven from said one or more second openings formed in said at least one of the top wall or the bottom wall of said at least one plenum comprises: directing at least a portion of the heated gas through said at least one squash-baffle opening formed in said at least one squash baffle.

Example 12 includes the method of Example 11, wherein said at least one plenum has at least two squash baffles and wherein supplying the heated gas to the plurality of plenums comprises one of: supplying the heated gas to one end of said at least one plenum, wherein said at least one plenum is configured so that the squash baffles are arranged in a V shape; or supplying the heated gas to two ends of said at least one plenum, wherein said at least one plenum is configured so that the squash baffles are arranged in a diamond shape.

Example 13 includes the method of any of the Examples 9-12, wherein said one or more second openings formed in said at least one of the top wall or the bottom wall of said at least one plenum comprises: at least one slot formed in said at least one of the top wall or the bottom wall of said at least one plenum; and a structure having a rounded surface positioned in the slot flush with said at least one of the top wall or the bottom wall of said at least one plenum; and wherein directing at least a portion of the heated gas into the interior of the oven from said one or more second openings formed in said at least one of the top wall or the bottom wall of said at least one plenum comprises: directing at least a portion of the heated gas through said at least one slot so that at least some of the gas passes over at least a part of the rounded surface of the structure as the gas exits said at least one slot.

Example 14 includes the method of any of the Examples 9-13, wherein the structure comprises a threaded rod or tube, a fluted rod or tube, or a corrugated rod or tube.

Example 15 includes the method of any of the Examples 9-14, wherein said at least one plenum comprises: a V-shaped indentation formed in said at least one of the top wall or the bottom wall of said at least one plenum, the V-shaped indentation comprising two sides, wherein said one or more second openings are formed in each of the sides of the V-shaped indentation; and a V-shaped cover positioned in the V-shape indentation; and wherein directing at least a portion of the heated gas into the interior of the oven from said one or more second openings formed in said at least one of the top wall or the bottom wall of said at least one plenum comprises: directing at least a portion of the heated gas through said one or more second openings formed in each of the sides of the V-shaped indentation.

What is claimed is:

1. An oven for heating fibers, the oven comprising:
a supply structure disposed within the oven between first and second ends of the oven, the supply structure comprising a plurality of plenums, wherein the plenums are in fluid communication with a heating system;
wherein a first one of the plenums is configured to receive heated gas from the heating system via the supply structure and comprises:
a pair of side walls, a bottom wall, and a top wall;
first openings formed in the respective side walls of the first one of the plenums;
one or more second openings formed in at least one of the top wall or the bottom wall of the first one of the plenums; and
at least one squash baffle configured to direct a first portion of the heated gas into the chamber uniformly from the first openings and having one or more squash-baffle openings, the at least one squash baffle dividing the first one of the plenums into at least two volumes, wherein the first one of the volumes is configured to supply a first portion of heated gas from the heating system into the chamber from the first openings and a second one of the volumes configured to supply a second portion of the heated gas into the chamber through the one or more second openings of said at least one plenum, the at least one squash baffle configured to pass the second portion of the heated gas through the one or more squash-baffle openings, wherein the first one of the plenums, wherein said one or more second openings formed in said at least one of the top wall or the bottom wall of said at least one plenum comprises:
at least one slot formed in said at least one of the top wall or the bottom wall of said at least one plenum; and
a structure having a rounded surface positioned in the slot flush with said at least one of the top wall or the bottom wall of said at least one plenum, wherein the structure is configured to induce the Coanda effect in the second portion of the heated gas.

2. The oven of claim 1, wherein said one or more second openings are formed in:
only the top wall of said at least one plenum;
only the bottom wall of said at least one plenum; or
both the top wall and the bottom wall of said at least one plenum.

3. The oven of claim 1, wherein the first one of the plenums comprises two or more squash baffles configured to form a space between the two or more squash baffles, wherein said one or more second openings are formed in at least one of the top wall or the bottom wall of said at least one plenum in the space between the two or more squash baffles; and
wherein the squash baffles are configured to least one of:
receive heated air from one end thereof, wherein said at least one plenum is configured so that the squash baffles are arranged in a V shape; or
receive heated air from two ends thereof, wherein said plenum is configured so that the squash baffles are arranged in a diamond shape.

4. The oven of claim 1, wherein the structure comprises a threaded rod or tube, a fluted rod or tube, or a corrugated rod or tube.

5. A method of heating fibers using an oven, the method comprising:
supplying heated gas to a plurality of plenums included in a supply structure disposed within an interior of the oven;
directing a first portion of the heated gas into the interior of the oven from first openings formed in side walls included in a first one of the plenums; and
directing a second portion of the heated gas into the interior of the oven from one or more second openings formed in at least one of the top wall or the bottom wall of first one of the plenums,
wherein directing the second portion of the heated gas into the interior of the oven from said one or more second openings formed in said at least one of the top wall or the bottom wall of said at least one plenum comprises directing the second portion of the heated gas through at least one slot formed in said at least one of the top wall or the bottom wall of the first one of the plenums so that at least some of the gas passes over at least a part of a rounded surface of a structure, positioned in the slot flush with said at least one of the top wall or the bottom wall of the first one of the plenums, as the gas exits said at least one slot, to induce a Coanda effect between the second portion of the heated gas and the at least one of the top wall or the bottom wall, wherein the directing of the second portion comprises directing the heated gas from a first volume of the first one of the plenums to a second volume of the first one of the plenums through one or more squash-baffle openings of one or more squash baffles, the one or more squash baffles dividing the first one of the plenums into at least the first volume and the second volume, wherein the directing of the first portion of the heated gas from the first openings comprises the one or more squash baffles directing the first portion of the heated gas uniformly through the first openings.

6. The method of claim 5, wherein said one or more second openings are formed in:

only the top wall of said at least one plenum;
only the bottom wall of said at least one plenum; or
both the top wall and the bottom wall of said at least one plenum.

7. The method of claim 5, wherein the first one of the plenums has at least two squash baffles and wherein supplying the heated gas to the plurality of plenums comprises one of:

supplying the heated gas to one end of the first one of the plenums, wherein the first one of the plenums is configured so that the squash baffles are arranged in a V shape; or supplying the heated gas to two ends of the first one of the plenums, wherein the first one of the plenums is configured so that the squash baffles are arranged in a diamond shape.

8. The method of claim 5, wherein the structure comprises a threaded rod or tube, a fluted rod or tube, or a corrugated rod or tube.

* * * * *